United States Patent [19]

Hochstein

[11] 4,450,431

[45] May 22, 1984

[54] CONDITION MONITORING SYSTEM (TIRE PRESSURE)

[76] Inventor: Peter A. Hochstein, 14020 Fifteen Mile Rd., Sterling Heights, Mich. 48077

[21] Appl. No.: 267,258

[22] Filed: May 26, 1981

[51] Int. Cl.³ .............................................. B60C 23/00
[52] U.S. Cl. ................................. 340/58; 340/870.31; 340/505; 340/539; 343/6.5 SS
[58] Field of Search .................... 340/58, 572, 870.31, 340/539, 505; 200/61.22, 61.25; 73/146.5; 343/6.5 R, 6.5 SS, 6.8 R

[56] References Cited

U.S. PATENT DOCUMENTS

| | | | |
|---|---|---|---|
| 2,274,557 | 2/1942 | Morgan et al. | 340/58 |
| 3,694,803 | 9/1972 | Strenglein | 340/58 |
| 3,723,966 | 3/1973 | Mueller et al. | 340/58 |
| 3,798,642 | 3/1974 | Augenblick et al. | 340/572 X |
| 3,806,905 | 4/1974 | Strenglein | 340/58 X |
| 3,911,434 | 10/1975 | Cook | 340/58 X |
| 3,990,041 | 11/1976 | Blanchier | 340/58 |
| 4,067,235 | 1/1978 | Markland et al. | 73/146.5 |
| 4,074,227 | 2/1978 | Kalmus | 343/6.8 R X |
| 4,174,515 | 11/1979 | Marzolf | 340/58 |
| 4,303,910 | 12/1981 | McCann | 343/6.5 SS X |

Primary Examiner—David L. Trafton
Assistant Examiner—Joseph Nowicki
Attorney, Agent, or Firm—Harold W. Milton, Jr.

[57] ABSTRACT

A monitoring system for monitoring the condition in a vehicle wheel mounted tire. The system includes first and second LC circuits disposed within the tire and interconnected by a diode multiplier in series with a pressure switch. An exciter establishes an energetic electromagnetic field of a first frequency such that a first LC circuit is resonant at the same first frequency. This first frequency is converted into energy of a second frequency by a harmonic multiplier diode and is impressed upon a second LC circuit which is resonant at the second frequency, the second frequency being either an even or odd harmonic of the first (exciting) frequency. A receiver tuned to the second frequency interrogates the second LC circuit for presence of harmonic energy at the second frequency. A pressure switch opens when the tire pressure falls below a predetermined pressure which prevents activation of the second LC circuit so that the receiver will not sense the second frequency to which the second LC circuit is resonant, in which case there is provided an indication that the tire pressure is below the desired pressure. A scanner scans the receiver successively from one tire to another of a vehicle.

12 Claims, 6 Drawing Figures

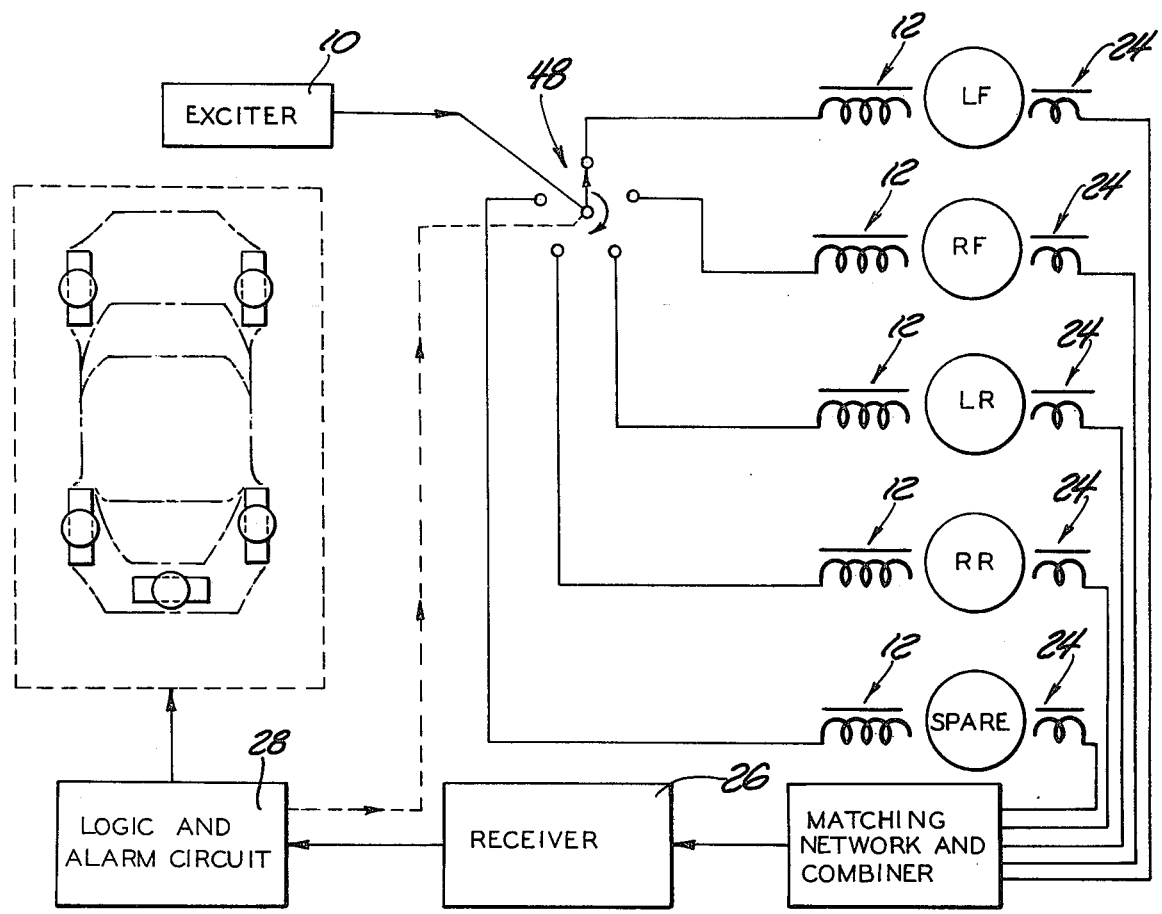
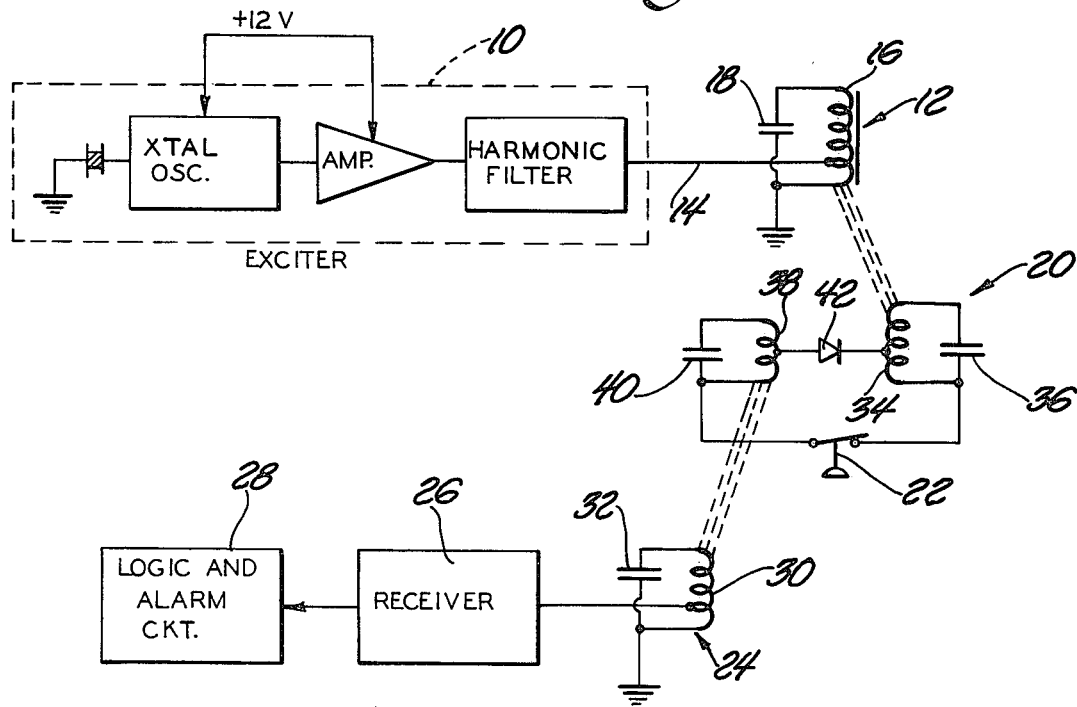
Fig. 1

CONDITION MONITORING SYSTEM (TIRE PRESSURE)

BACKGROUND OF THE INVENTION (1) Field of the Invention

The subject invention relates to a method and system for monitoring the condition of a vehicle wheel mounted tire such as the pressure or temperature within the tire.

(2) Description of the Prior Art

For some time there has been interest in monitoring the air pressure in a pneumatic tire. Because an important factor governing the useful service life of a pneumatic tire is correct inflation pressure, there has been significant interest with truck tires because of their relatively high replacement cost. There is now, however, also significant interest in monitoring the tire inflation pressures on passenger cars because correct inflation pressures significantly improve fuel economy by decreasing tire rolling resistance.

Many systems have been proposed to continuously monitor tire pressure on a vehicle but none have been widely adopted because of difficulties with either cost, complexity, reliability or a combination of these factors.

The prior systems have either been mechanical or electrical with the mechanical systems having been virtually eliminated from consideration. Electrical systems have included a battery powered wheel mounted radio transmitter or a passive circuit, energy absorbing type or an induction or transformer type. The battery type is such that the system draws power from the battery only when a decrease in pressure or rise in temperature occurs to power the transmitter. These systems have not been widely accepted because they are not fail-safe in that, if a malfunction occurs in the system, there is no indication whatsoever. In a fail-safe system, the monitor must be active and self-checking until a fault is sensed such as a decrease in the tire pressure below a predetermined pressure. If a battery were to be utilized in such a system it would have to be continually recharged because the system would be providing a signal at all times except when a fault is sensed.

Passive circuits which have been utilized to sense tire pressure have not had the desired sensitivity and have inherent coupling problems. Furthermore, coupling to the antenna in such systems is a function of the rotational position of the wheel, thereby allowing only intermittent sensing. Reliable pressure sensing on a non-moving vehicle is, therefore, impossible.

SUMMARY OF THE INVENTION

The invention is a tire condition monitor system for monitoring the condition in a vehicle wheel mounted tire. The system includes an exciter means for establishing an electromagnetic energy field having a first frequency and a passive converter means responsive to the first frequency creates energy having a second frequency. The energy at the second frequency is changed in response to a predetermined change of the tire condition and a receiver means is responsive to the energy signal at the second frequency for providing an indication regarding the energy signal at the second frequency. The converter means includes multiplier means for making the second frequency a harmonic of the first frequency.

PRIOR ART STATEMENT

The U.S. Pat. No. 3,723,966 granted Mar. 27, 1973 to Mueller et al discloses a passive circuit-type tire monitor including a passive converter circuit having a pressure switch in the circuit. A transmitter transmits to the passive circuit which, in turn, absorbs some of the transmitted signal by being resonant at the same frequency as that of the transmitted signal. The received, measured, signal is actually the transmitted signal energy minus that energy absorbed by the passive circuit which is resonant to the transmitter at the same frequency. The problem with such a system is the separation of the relatively large transmitted signal from the relatively small absorbed signal.

Another monitoring system is disclosed in U.S. Pat. No. 2,274,557 granted Feb. 24, 1942 to Morgan et al. There is disclosed therein a system employing three circuits with the second responsive to the first to provide an indication in the third circuit. Again, the problem is the lack of separation between the signals.

Yet another system is disclosed in U.S. Pat. No. 4,067,235 granted Jan. 10, 1978 to Markland et al. wherein a tire pressure sensor receives radiated energy and converts that energy into electrical power to power a conventional transmitter circuit. A tank circuit, rectifier, regulator oscillator and other components are used to increase the output frequency as the tire pressure increases. A relatively large amount of power is required for creating the radiated energy received by the sensor. The subject invention regains relatively low power for creating the radiated energy which, in turn, is directly converted to a harmonic frequency of the radiated energy.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic view of the subject system associated with a vehicle;

FIG. 2 is a schematic view of one embodiment of the invention;

DESCRIPTION OF THE PREFERRED EMBODIMENTS

A tire condition monitor system is shown in FIG. 1 for monitoring the condition in all of the tires of a passenger vehicle. FIG. 2 illustrates a first embodiment of a basic system for monitoring the condition of a singular vehicle wheel mounted tire. The invention will be described as monitoring the pressure in a vehicle tire, however, it will be appreciated that other conditions may be monitored, such as temperature.

The monitoring system illustrated in FIG. 2 includes an exciter means for establishing an electromagnetic energy field having a first frequency. The exciter means comprises the exciter 10 and the exciter antenna coil generally shown at 12. Preferably, a crystal controlled conventional exciter 10 is used to generate 100 mW to 400 mW of radio frequency energy preferably at 9.5 MHz. The exciter includes an oscillator, an amplifier and a harmonic filter to attenuate undesired harmonics, all of which are conventional; value of the components depends upon the frequency selected.

Figure 4:
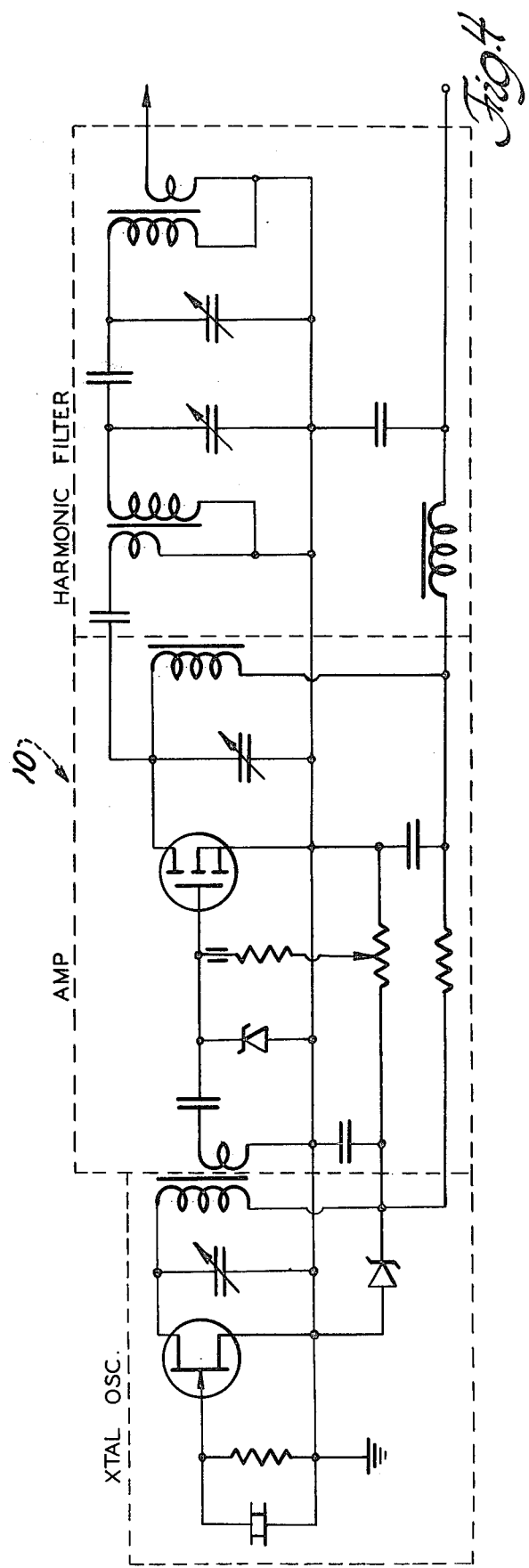
FIG. 4 discloses an example circuit for the exciter.

FIG. 4 illustrates a circuit for the exciter 10 which includes a conventional oscillator, conventional amplifier and conventional harmonic filter. The values for the various components utilized in the circuit depend upon the frequency selected.

The output of the harmonic filter is matched to drive a low impedance transmission line 14, typically 50 or 75 Ohms. The line 14 feeds an H-field radiator or antenna which is resonant at the first frequency. The radiator antenna 12 consists of a resonant, high Q, parallel tuned LC circuit consisting of a ferrite core coil 16 and a resonating capacitor 18, a specific example of which is disclosed and claimed in applicant's co-pending application Ser. No. 267,257, now abandoned filed concurrently herewith and assigned to the assignee of the subject invention.

The monitoring system further includes a converter means generally shown at 20, adapted to be carried by the vehicle wheel for creating energy at a second frequency in response to the first frequency. Also included is a sensing means in the form of switch 22 for causing a change in the amplitude of energy at the second frequency in response to a predetermined change of the tire condition, e.g., tire pressure.

Figure 5:
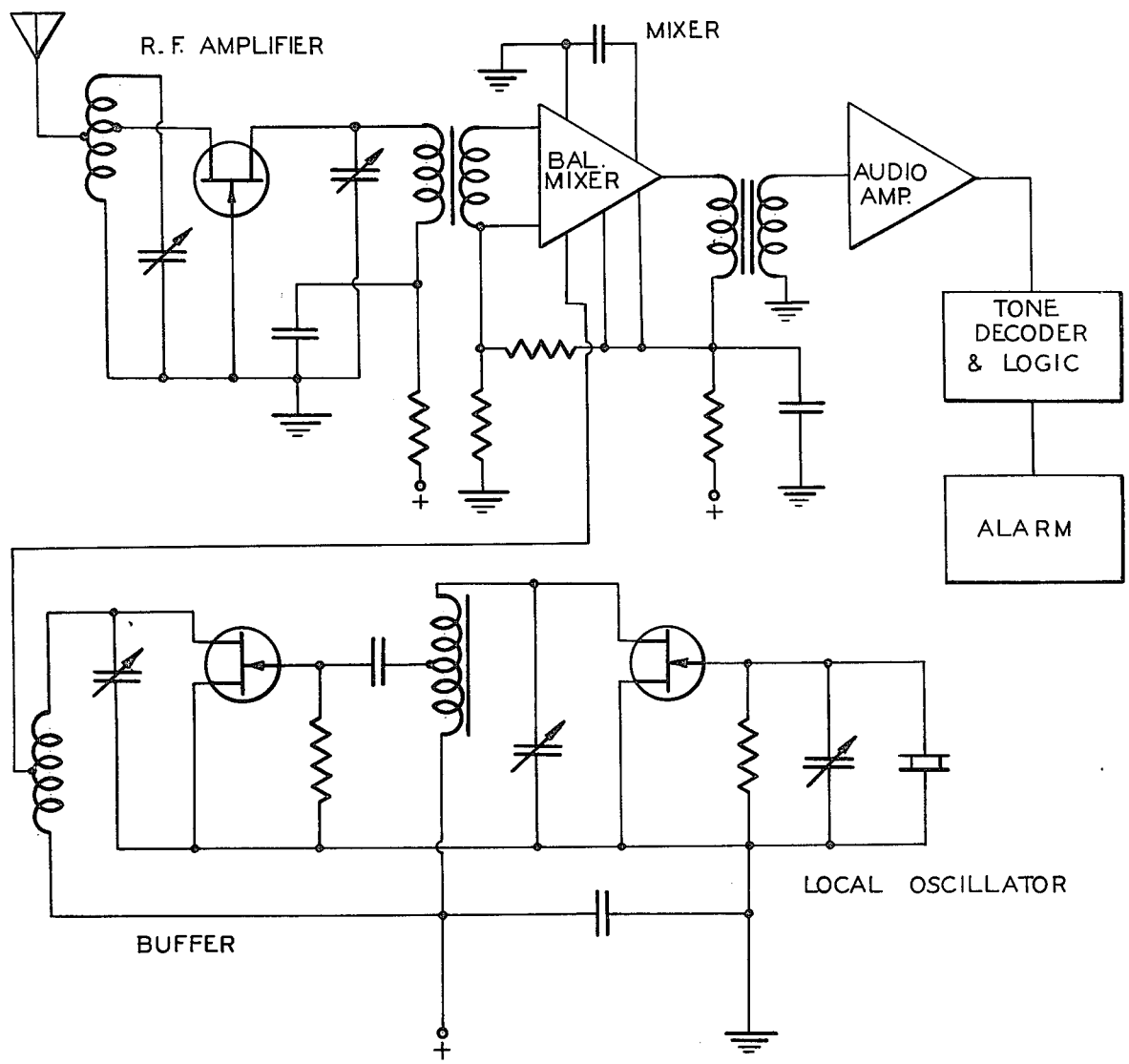
FIG. 5 discloses an example circuit for the receiver.

The system further includes receiver or interrogation means responsive to the energy at the second frequency for providing an indication regarding the energy at the second frequency. The receiver or interrogation means includes the receiver antenna coil 24 and the receiver 26. The receiver 26 may be any one of many conventional well known receiver circuits, an example of such a circuit being shown in FIG. 5. The receiver antenna coil 24 is similar to the radiator antenna coil 12 which comprises a parallel tuned LC network consisting of a ferrite core and coil 30 and a resonating capacitor 32 with both circuits being grounded, as indicated.

The system is characterized by the converter means 20 being responsive to the first frequency of the field established by the radiator antenna coil 12 and creating energy at a second and different frequency, i.e., a harmonic of the first frequency. The converter means 20 includes a first passive LC circuit, comprising a coil 34 in parallel with a capacitor 36, and which is resonant to the first frequency propagated by antenna coil 12. The converter means 20 also includes a second passive LC circuit including the coil 38 in parallel with the capacitor 40 and the resonant to the second frequency which is different from the first frequency. The converter means 20 includes a harmonic multiplier in the form of a diode 42 for making the second frequency a harmonic of the first frequency. The diode 42 interconnects the coils 34 and 38 of the LC circuits. Preferably, the second LC circuit comprising the coil 38 and capacitor 40 is resonant at a second or third harmonic of the frequency at which the first LC circuit (comprising the coil 34 and capacitor 36) is resonant. The switch 22 is preferably a pressure switch defining a sensing means which interconnects the first and second LC circuits and is in series with the diode 42, although the switch 22 may in some instances be in parallel with the diode 42. The pressure switch 22 opens to disable the converter circuit in response to the tire pressure falling below a predetermined pressure. The pressure switch 22 will close to enable the converter circuit in response to pressure at and above the predetermined pressure. Thus, the pressure switch 22 is connected to the converter means 20 for terminating the converting activity in response to an undesired predetermined change of the tire pressure condition.

The excitation of the converting circuit takes place at one frequency while reception of the converted signal occurs at another frequency which is harmonically related to the first frequency. The system includes an indicator means comprising the logic and alarm circuit 28 which is responsive to the receiver 26 of the interrogation means for providing an alarm upon the discontinuance of the interrogation means sensing the second signal from the converting means 20. The indication means would also provide an alarm upon the initiation of the interrogation means sensing the second signal from the converter means 20. Thus, an alarm is provided when the tire pressure falls below the predetermined pressure and an alarm is also provided when the tire pressure rises to the predetermined pressure, the circuit for accomplishing this is explained hereinafter. This is an important feature and, should the tire pressure fall below a predetermined desired level, an alarm will be sounded for a short period of time whereas a light will remain "on" indicating the low tire pressure. Upon reinflating the tire to the proper or desired pressure, the alarm will again sound and the light will be turned off eliminating the need for a tire pressure gauge when inflating the tires. It is also important that the system is fail-safe. The receiving antenna coil 24 constantly interrogates the converting circuit 20 for the second frequency from the LC circuit 38, 40 which second frequency is in existence so long as the pressure switch 22 is closed and there is no other malfunction in any of the circuits. If, however, the pressure switch 22 opens or there is another malfunction in the system to discontinue the converted signal in the LC circuit 38, 40, the interrogating receiving antenna 24 will not sense that second frequency of the second signal whereby an alarm is produced to indicate a low tire pressure or that the system is not functioning properly.

Figure 3:
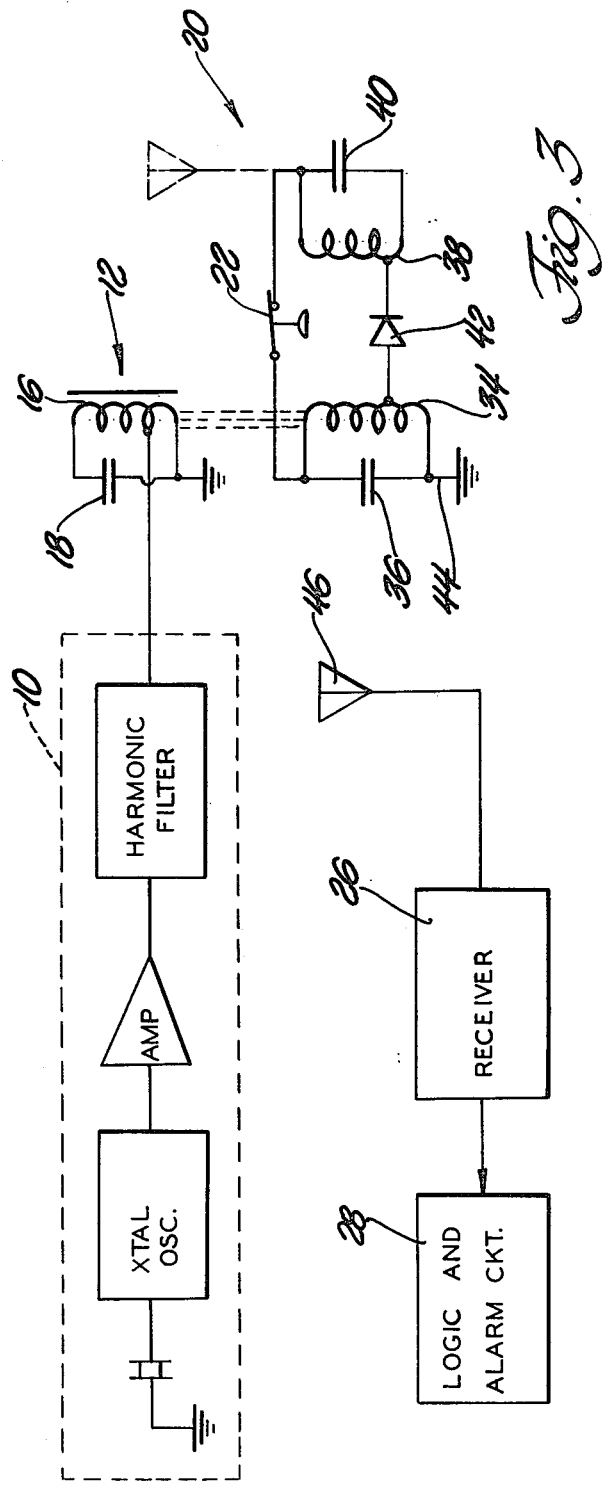
FIG. 3 is a schematic view similar to FIG. 2 but showing a second embodiment.

The embodiment of FIG. 3 includes the same or like components as the system of FIG. 2 with those same or like components identified by like reference numerals. The embodiment of FIG. 3 differs from the embodiment of FIG. 1 in that the first LC circuit 34, 36 is grounded at 44 to the vehicle wheel for propagating an E-field from the LC circuit 38, 40. The interrogation means includes an E-field antenna 46 for receiving the E-field from the second LC circuit 38, 40. This propagation which is characteristic of conventional radio transmitting antennas, offers substantial advantages over the H-field or magnetic field system of FIG. 2, the most significant of which is that the E-field receiving antenna 46 may be disposed a greater distance from the LC circuit 38, 40 of the converting means. In the system of FIG. 3, the structure of the harmonic generator coil 38 functions as a radiator or antenna and the steel wheel of the vehicle functions as a grounded counterpoise.

The converting means 20 preferably takes the form of the coils 34 and 38 being disposed circumferentially about the rim of a vehicular wheel and it is of the type more specifically disclosed and claimed in applicant's co-pending application Ser. No. 267,261 filed concurrently herewith and assigned to the assignee of the subject invention.

FIGS. 2 and 3 are illustrative of embodiments for monitoring the tire pressure of a single wheel. FIG. 1 schematically shows a system for serially or sequentially interrogating the various tires of a passenger vehicle including a spare tire. An exciter or radiating antenna 12 is disposed adjacent each tire and wheel assembly as is a receiving antenna 24. The antennas 12 all send the signal of the same frequency and all of the receiving antennas 24 are looking for the same harmonic of that frequency. A commutator or scanner generally shown at 48 is utilized to sequentially connect the exciter 10 to the respective antenna coils 12.

The matching network and combiner matches the impedance of the outputs from the various receiver coils 24 to the receiver 26 for efficient energy transfer, as is well known.

The decoding logic and alarm circuit 28 basically determines which tire is being excited and sequentially connects the output of the receiver to an indicator light for that tire and causes that light to illuminate if there is no signal from the receiver, and further causes an audible alarm.

Figure 6:
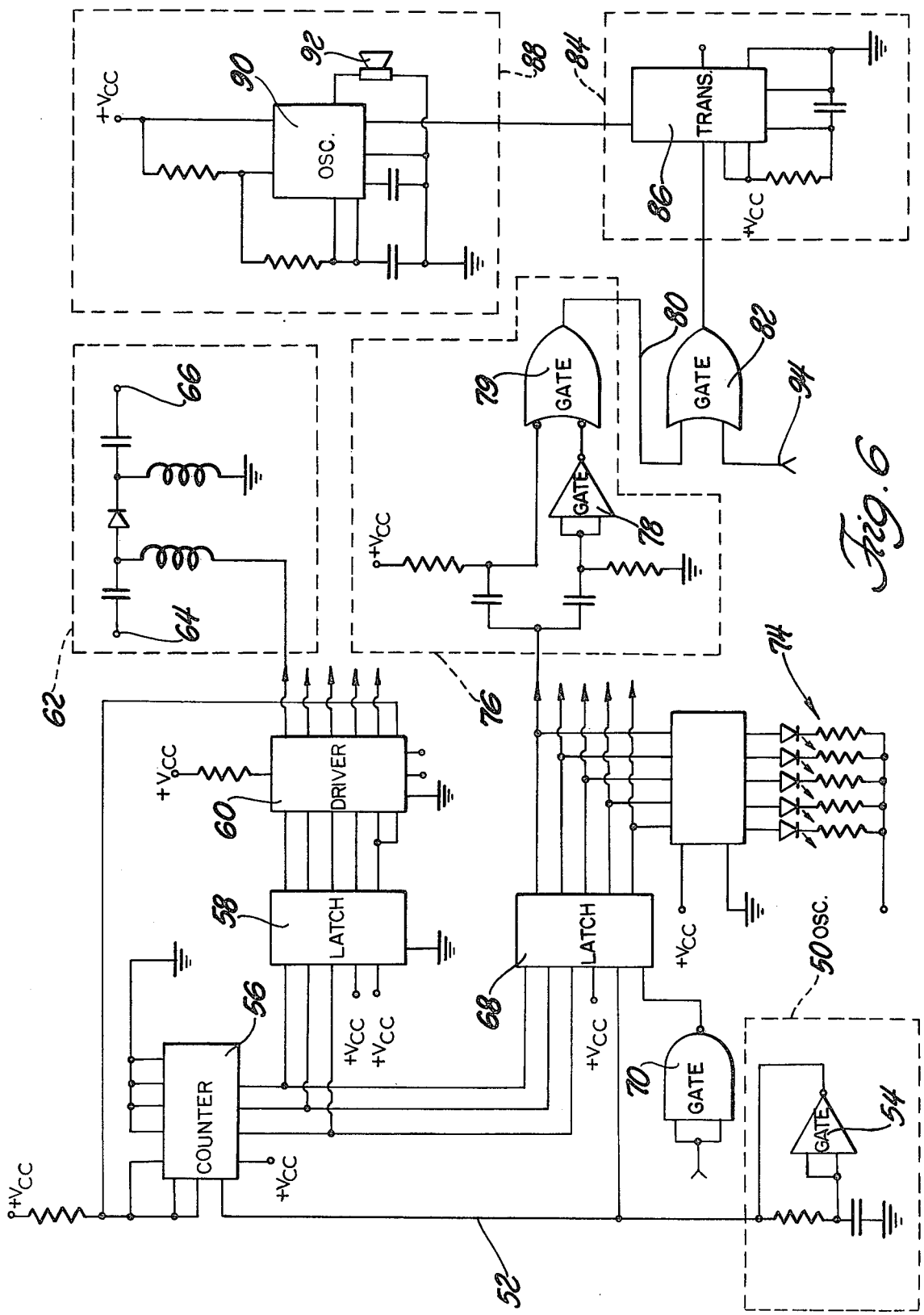
FIG. 6 discloses a logic and alarm circuit.

As alluded to above, an advantage of the E-field system illustrated in FIG. 3 is that a single E-field receiving antenna 46 may be utilized to sense all of the converters associated with all the vehicle wheels of a passenger car vehicle. In order to scan the various wheels with the single antenna receiver in the E-field system of FIG. 3, two scanners or commutators, such as that schematically illustrated at 48, could be utilized to functionally rotate in unison. The first scanner would sequentially connect the output of the exciter 10 to the various exciter coils or radiating antennas 12. In addition, however, there would be a second scanner or commutator which functionally moves in unison therewith to sequentially connect the appropriate indicator lamps to the output of the receiver 26. Thus, when a converter in a given wheel is being excited the receiving antenna 46 should be receiving a signal which would be detected in the receiver 26. The two parallel scanners or commutators would sequentially check each wheel and tire assembly. The mechanical scanners are shown for simplicity; normally, the scanning would be accomplished electronically. FIG. 6 discloses a logic and alarm circuit which scans electronically.

The circuit includes a clock oscillator 50 having a capacitor and resistor which determine the frequency of the signal transmitted along the clock line 52. The element 54 may be a CMOS 4093 Quad 2-input Nand gate. The element 56 is a binary three bit counter, which may be a CMOS 74C161 programmable ($\div n$) binary counter. The element 58 may be a CMOS 4099 transparent addressable latch which converts the binary three bit input to decimal outputs continually scanning the five (5) outputs lines to a decoding driver 60 which amplifies the various signals and sequentially enables each of five (5) exciter coil circuits 62, one for each wheel and a spare. For simplicity, only one of the five (5) exciter coil circuits 62 is illustrated. Each circuit 62 has an input 64 from the exciter means 10 which passes through a diode acting as a R.F. switch to the connection 66 to the exciter coil 12 adjacent each tire, the exciter coil 12 establishing the energy field to which the converter 20 is responsive.

The output of the binary counter 56 also drives a CMOS 4099 latch 68 which converts binary to decimal and scans the five decimal positions but does not provide an output to anyone of its five output lines unless enabled to do so by a signal from the Nand gate 70. The Nand gate 70 may be a CMOS 4093 Quad 2-input Nand gate. The gate 70 has an input 72 from the receiver 26. When the signal from the receiver is low or non-existent (as when the tire pressure falls below the predetermined tire pressure), the gate 70 sends a signal to the latch 68. The latch 68 is scanning the five tires in synchronization with the latch 58, so that a single E-field antenna would not receive a signal when the exciter coil for one of the tires is producing an energy field but the converter 20 is not responding. Therefore, the output from latch 68 would be for that specific tire. The signal would drive a transistor array (e.g., of the ULN 2003 Darlington type), which would illuminate the appropriate one of five fault indicator lights or L.E.D.'s 74.

The output of the latch 68 will drive one of five edge detector circuits 76.

Each edge detector circuit 76 includes two CMOS 4093 Quad 2-input Nand gates 78 and 79 and produces an output signal in line 80 in response to the initiation of the output from the latch 68 and also in response to the discontinuance of the output from the latch 68, as when the tire is inflated to the proper pressure.

The signal in line 80 actuates on Or gate 82 (e.g., CMOS 4071 Quad 2-input Or gate). The gate 82 triggers the monostable circuit 84 (including a CMOS 4528 monostable 86) which produces a pulse and determines the width of the pulse, e.g., one second. This pulse enables the audio alarm circuit 88. The alarm circuit 88 includes a 555 I.C. power oscillator 90 and audio transducer 92, the time duration of the pulse from the monostable circuit 84 determining the duration of the audio alarm. Because the edge detector circuit 76 produces a signal, both when the scanned position signal drops out and falls back in, an alarm is produced both when the tire pressure drops below the predetermined pressure and when the pressure returns to the predetermined pressure.

The gate 82 has an input 94 which is from a second Or gate, the same as 82, which second gate has an input from a second edge detector circuit for a second tire and an input from yet a third gate, the same as 82 for the third tire, and so on for the five tires.

All of the voltage inputs (Vcc) are typically 6 volts, and are regulated down from the vehicular power supply.

Thus, the logic and alarm circuit of FIG. 6 scans the various tires and provides an indication by light when a tire condition is unsatisfactory with the light indicating which tire and also provides an audio alarm when the unsatisfactory condition occurs and when it is corrected. The system is also fail-safe in that a fault indication will occur if any active component fails in the system.

Inoperable (burned out) indicator lamps would normally present a reliability problem, however, the redundant audible alarm would alert the driver to indicator malfunctions.

Furthermore, a manual push-to-test feature could check all indicating circuits at operator command. Alternately, an automatic self test circuit could check all indicators on initial power-up; i.e., starting of the vehicle.

At 10 MHz, a practical radiator antenna coil 12 would consist of a Q-2 ferrite core approximately 0.5" in diameter by 3.0" long with six to eight turns of 0.10" wide copper tape tapped and fed at one turn. In practice, one such coil is mounted in proximity to each wheel rim (from 1" to 4" away) so as to induce the 10 MHz H-field into the converter. To minimize electromagnetic interference due to E-field propagation, each exciter coil 12 is shielded with a special grounded electrostatic shield which surrounds the core.

In the form of the system shown in FIG. 2, r.f. current induced in the first resonant circuits 34, 36 of the passive, wheel mounted converter 20 causes harmonic energy to be created by diode 42 whereby the second resonant circuit 38, 40 of the converter (which is turned to a harmonic of ($f_o$) is excited. The excitation of the second tuned circuit causes a second H-field to exist at the harmonic multiple of the fundamental ($f_o$) frequency. The harmonic H-field is typically sensed by means of a pickup antenna coil 24 located in proximity to the wheel (1" to 12" away). Reception of second harmonic energy by the antenna is optimized by once again using a high Q ferrite loaded coil and resonating capacitor, sharply tuned to the desired harmonic (typically $2f_o$). In order to preserve the high loaded Q and to optimize energy transfer, the ferrite antenna coil is properly tapped or impedance matched to the low impedance transmission line which conducts the received signal to an appropriate tuned receiver 26. Using a receiving antenna coil similar in dimensions to the exciter coil, r.f. levels of 10–20 uV were recovered at $2f_o$ when exciter power was nominally 300 mW and coil to wheel spacing was maintained at two inches.

It has been empirically determined that in order to effectuate maximum power transfer to and from the harmonic generator or converter a high Q in both $f_o$ and $nf_o$ circuits is critical; and careful impedance matching the harmonic multiplier diode 42 to both coils 34 and 38 accomplishes this by optimum connections of the diode 42 along the respective coils 34 and 38.

The invention has been described in an illustrative manner, and it is to be understood that the teminology which has been used in intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A tire condition monitoring system for monitoring the condition of a wheel mounted tire comprising; exciter means for establishing an electromagnetic energy field having a first frequency, passive converter means responsive to said first frequency for creating energy having a second frequency, sensing means for changing amplitude of said energy at said second frequency by said converter means in response to a predetermined change of the tire condition, receiver means responsible to said energy at said second frequency for providing an indication regarding said energy at said second frequency, said converting means including harmonic multiplier means for making said second frequency a harmonic of said first frequency, said exciter means being inductively coupled to said converter means through a magnetic field, said receiver means including an E-field antenna for receiving an E-field from said converter means.

2. A system as set forth in claim 1 wherein said converter means includes a first passive LC circuit coupled inductively to said exciter means and resonant to said first frequency and a second passive LC circuit resonant to said second frequency, said harmonic multiplier means interconnecting said first and second LC circuits for making said second frequency a harmonic of said first frequency, said first LC circuit being grounded for propagating the E-field from said second LC circuit, said sensing means being disposed for disabling said second LC circuit.

3. A system as set forth in claim 2 wherein said sensing means comprises a pressure switch which opens to dissable the converter circuit in response to the tire pressure falling below a predetermined pressure and which closes to enable the converter circuit in response to pressure at and above said predetermined pressure.

4. A system as set forth in claim 1 wherein said exciter means is shielded against E-field propagation.

5. A system as set forth in claim 1 including a plurality of said converter means, each having the same respective first and second frequencies, and scanner means for serially detecting the E-field from the respective converter means through said E-field antenna.

6. A system as set forth in claim 1 including a plurality of said converter means, and wherein said receiver means includes scanner means for serially interrogating said respective converter means one after the other.

7. A system as set forth in claim 6 wherein said first frequencies are the same for each of said converter means and said second frequencies are the same for each of said converter means.

8. A tire condition monitoring system for monitoring the condition of a wheel mounted tire comprising; exciter means for establishing an electromagnetic energy field having a first frequency, passive converter means responsive to said first frequency for creating energy having a second frequency, sensing means for changing amplitude of said energy at said second frequency by said converter means in response to a predetermined change of the tire condition, receiver means responsive to said energy at said second frequency for providing an indication regarding said energy at said second frequency, said converting means including harmonic multiplier means for making said second frequency a harmonic of said first frequency, said converter means including a converter circuit and said sensing means comprising a pressure switch in said converter circuit for disabling said circuit in response to the tire pressure falling below a predetermined pressure for terminating the creation of said energy at said second frequency in response to an undesired low pressure, indicator means responsive to said receiver means for producing an alarm upon the discontinuance of said receiver means sensing said energy at said second frequency and an alarm upon initiation of said interrogation means sensing said energy at said second frequency so that an alarm is provided when tire pressure falls below the predetermined pressure and an alarm is provided when the tire pressure rises to the predetermined pressure.

9. A method of monitoring the condition of a vehicle wheel mounted tire comprising the steps of; establishing an inductive coupling with a field of electromagnetic energy having a first frequency, creating E-field energy having a second frequency which is a harmonic of the first frequency in response to the inductive coupling of said first energy, changing said E-field energy at said second frequency in response to a predetermined change of the tire condition, and interrogating for the existence of said E-field energy at said second frequency.

10. A method as set forth in claim 9 further defined as creating a first energy field at a plurality of wheels on a vehicle and serially scanning the creation of the energy at the second frequency at each wheel one after the other to serially determine the presence of energy at the second frequency at each wheel.

11. A method as set forth in claim 9 further defined as shielding of E-field energy in the establishment of the inductive coupling.

12. A method of monitoring the condition of a vehicle wheel mounted tire comprising the steps of; establishing a field of electromagnetic energy having a first frequency, creating energy having a second frequency which is a harmonic of the first frequency in response to said first energy, changing said energy at said second frequency in response to a predetermined change of the tire condition, interrogating for the existence of said energy at said second frequency, sensing the tire pressure, terminating the creation of energy at the second frequency in response to the tire pressure being below a predetermined pressure, providing an alarm upon the discontinuance of energy at the second frequency and providing an alarm upon the initiation of energy at the second frequency so that an alarm is provided when the tire pressure falls below the predetermined pressure and an alarm is provided when the tire pressure rises to the predetermined pressure.

* * * * *